United States Patent
Meriac et al.

(10) Patent No.: US 10,855,474 B2
(45) Date of Patent: Dec. 1, 2020

(54) AUTHORIZED OPERATIONS IN ELECTRONIC SYSTEMS

(71) Applicant: ARM IP Limited, Cambridge (GB)

(72) Inventors: Milosch Meriac, Cambridge (GB); Brendan James Moran, Histon (GB)

(73) Assignee: Arm IP Limited, Cambridge (GB)

( * ) Notice: Subject to any disclaimer, the term of this patent is extended or adjusted under 35 U.S.C. 154(b) by 198 days.

(21) Appl. No.: 16/025,403

(22) Filed: Jul. 2, 2018

(65) Prior Publication Data

US 2019/0036705 A1    Jan. 31, 2019

(30) Foreign Application Priority Data

Jul. 27, 2017 (GB) .................................. 1712128.6

(51) Int. Cl.
*H04L 9/32* (2006.01)
(52) U.S. Cl.
CPC ............ *H04L 9/3247* (2013.01); *H04L 9/321* (2013.01); *H04L 2209/72* (2013.01)
(58) Field of Classification Search
CPC ..... H04L 9/0861; H04L 9/321; H04L 9/3247; H04L 9/3234
See application file for complete search history.

(56) References Cited

U.S. PATENT DOCUMENTS

| | | | |
|---|---|---|---|
| 9,697,371 B1 * | 7/2017 | Willden | H04L 63/0428 |
| 2012/0192293 A1 | 7/2012 | Adkins et al. | |
| 2019/0266330 A1 * | 8/2019 | Thaler, III | H04L 63/123 |
| 2019/0349204 A1 * | 11/2019 | Enke | H04L 9/0861 |

FOREIGN PATENT DOCUMENTS

| | | |
|---|---|---|
| WO | WO 2009/131656 A2 | 10/2009 |
| WO | WO 2014/076116 A1 | 5/2014 |
| WO | WO 2016/100649 A1 | 6/2016 |

OTHER PUBLICATIONS

Examination Report dated Nov. 15, 2019 for GB Application No. 1712128.6, 6 pages.
Search Report dated Jan. 22, 2018 for GB Application No. GB1712128.6, 11 pages.

* cited by examiner

*Primary Examiner* — Olugbenga O Idowu
(74) *Attorney, Agent, or Firm* — Patterson Thuente Pedersen, P.A.

(57) ABSTRACT

A method of authorizing an operation on a remote device with a cryptographic signature verification component, the remote device being operable in a communications network having human-readable messages with message signatures, comprising receiving at an arbitrator an authorization request to perform an operation requiring authorization on the remote device; retrieving from the request an operation identifier and plaintext data; sending a human-readable request with the identifier and the plaintext data to an authorizer; receiving a reply from an authorizer, the reply message comprising at least the plaintext data and a verifiable cryptographic signature identifying the authorizer derived from the request; and on receiving the reply, sending a request to perform the operation to the remote device with an authorization derived from at least the cryptographic signature, the cryptographic signature being suitable for verification by the cryptographic signature verification component on the remote device.

14 Claims, 6 Drawing Sheets

AUTHORIZED OPERATIONS IN ELECTRONIC SYSTEMS

RELATED APPLICATION

The present application claims priority to GB Application No. 1712128.6 filed Jul. 27, 2017, which is hereby incorporated herein in its entirety by reference.

The present technology relates to methods and apparatus for securely authorizing operations, such as system configuration operations, to be performed on electronic devices in a networked computing environment.

In networked computing environments, it is often necessary to perform operations that may be security- or privacy-sensitive, or that may be vulnerable to malicious interference—because the devices are network-connected, an attack surface may be exploited to take over local processing operations on devices for unintended purposes. Examples of sensitive and vulnerable operations abound: download of new software or firmware, access control list update operations, file transfer operations, and many others will occur to one of ordinary skill in the computing art.

In such networked environments, conventional security authorization checking as it is carried out in data centres and private networks requires extra infrastructure. In environments in which devices are of reduced size, capacity and complexity, such as the sensors, local controllers and controlled devices of the Internet of Things (IoT), such extra infrastructure is undesirable. Indeed, for reasons of power, memory, processor and bandwidth capacity, it may not even be possible to install and use such an infrastructure on some IoT devices and networks.

In a first approach to the many difficulties encountered in seeking a lightweight way of securely authorizing operations, the present technology provides a machine-implemented method of authorizing an operation on at least one remote electronic device equipped with a cryptographic signature verification component.

The at least one remote electronic device is operable in a communications network having human-readable messages with message signatures, and the method comprises receiving at an arbitrator an authorization request to perform an operation on the at least one remote electronic device, the operation requiring authorization; retrieving from the request an identifier of the operation and at least one plaintext data item; sending a human-readable request message to an authorizer component, the human-readable request message comprising at least the identifier and the at least one plaintext data item; receiving a reply message from an address of an authorizer, the reply message comprising at least the plaintext data item and a verifiable cryptographic signature derived from the request message and identifying the authorizer; and responsive to receiving the reply message, sending a request message to request performance of the operation to the remote electronic device with an authorization derived from at least the cryptographic signature, the cryptographic signature being suitable to be further verified by the cryptographic signature verification component on the at least one remote electronic device.

Implementations of the disclosed technology will now be described, by way of example only, with reference to the accompanying drawings, in which.

Figure 1:
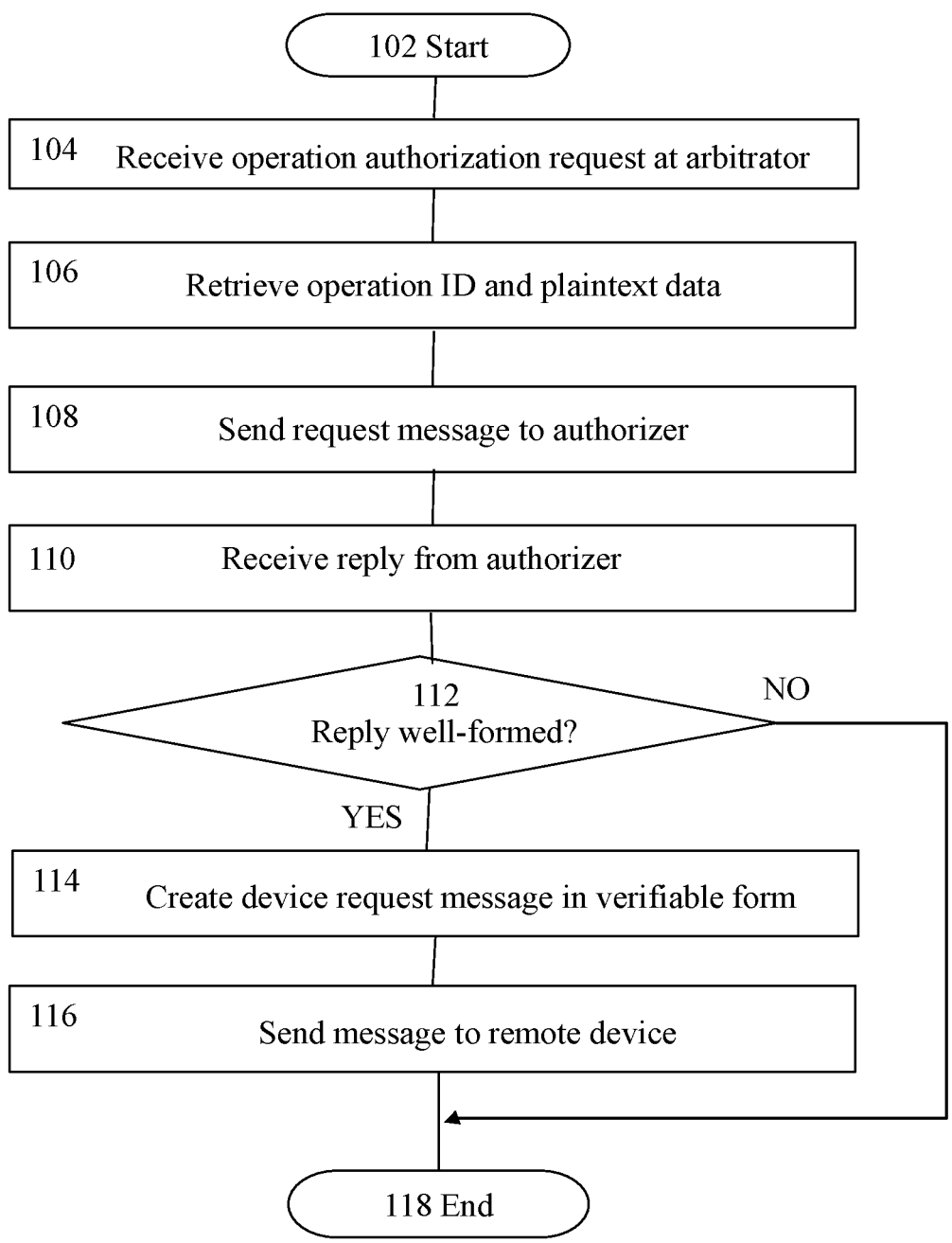
FIG. 1 shows an example of a method of operation according to the presently described technology.

In FIG. 1, there is shown an example of a method of operation 100, beginning at Start step 102. A request to authorize an operation on a remote device is received by the arbitrator at step 104. The arbitrator retrieves the operation identifier and plaintext data from the message at step 106, and constructs a request message to be sent to the authorizer. The request message is sent to the authorizer at step 108, and at step 110, a reply message is received from the authorizer. At this point, the arbitrator may verify the reply message in various ways, for example, by checking at test step 112 that the plaintext has not been modified, and/or that the message is well-formed (that is, that it complies with some rule or rules previously established). If the outcome of test step 112 is negative (that is, the reply message is deficient in some way), the process terminates without further action at End step 118. If the outcome of test step 112 is positive, the arbitrator constructs a device request message in a form that enables the remote device to verify it at step 114, and at step 116, the message is sent to the remote device. The process completes, for this instance, at End step 118.

This process is thus operable, in one implementation, to exploit the built-in security facilities of many present-day email systems, so that the operation request messages can be cryptographically signed by the email program. This technique enables end-to-end security between the remote device and a person authorized by the owner or operator of the remote device to approve requests to perform operations the remote device, thus preventing rogue requests for operations from being injected into the network, and providing a reliable, lightweight and auditable means of establishing an authorization procedure that can be relied upon. It will be clear to one of ordinary skill in the art that systems are continually evolving, and that thus the present technology is suitable for implementation in any system in which messages can be passed from entity to entity with verifiable security signatures attached natively by the messaging system, and not merely in present-day email systems.

Figure 2:
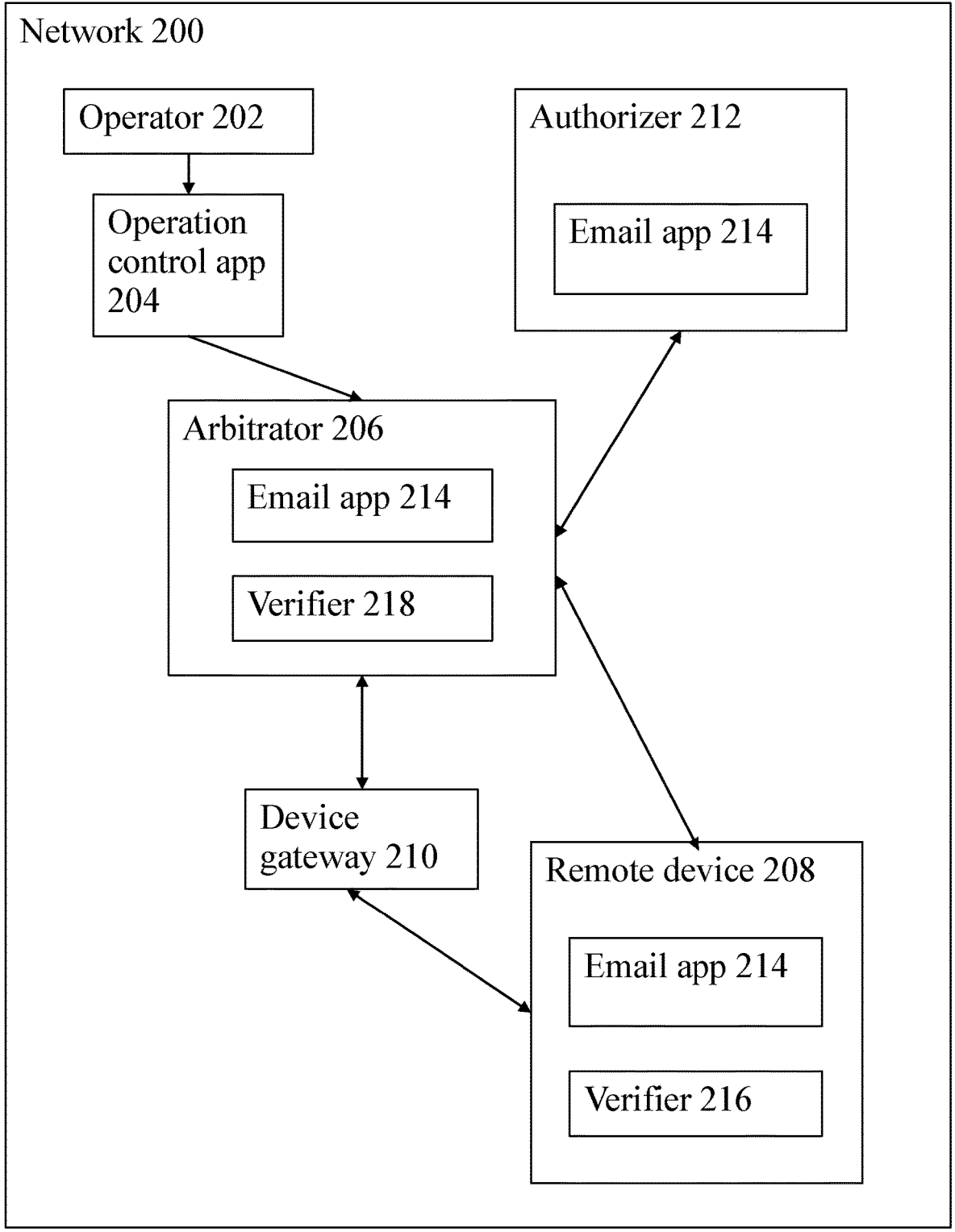
FIG. 2 shows an arrangement of hardware and software components within which the presently described technology may be implemented.

In FIG. 2 is shown an arrangement of hardware and software components in a network 200, giving a very simplified view of the components involved in an implementation operable to perform the method that was described above with reference to FIG. 1. Operator 202 is provided with an operation control app (application) 204, operable to enter into communication with arbitrator 206. Arbitrator 206 is provided with an instance of email app 214, which is operable to send emails to, and to receive emails from an authorizer 212, also equipped with an instance of email app 214. Remote device 208 is provided with its own instance of email app 214, and also with a verifier component, with which it is able to verify that a signed operation request email message is genuine and thus can be acted upon. In one implementation, arbitrator 206 may be provided with an optional verifier component 218. Communication between remote device 208 and arbitrator 206 may be direct or mediated through device gateway 210.

Figure 3:
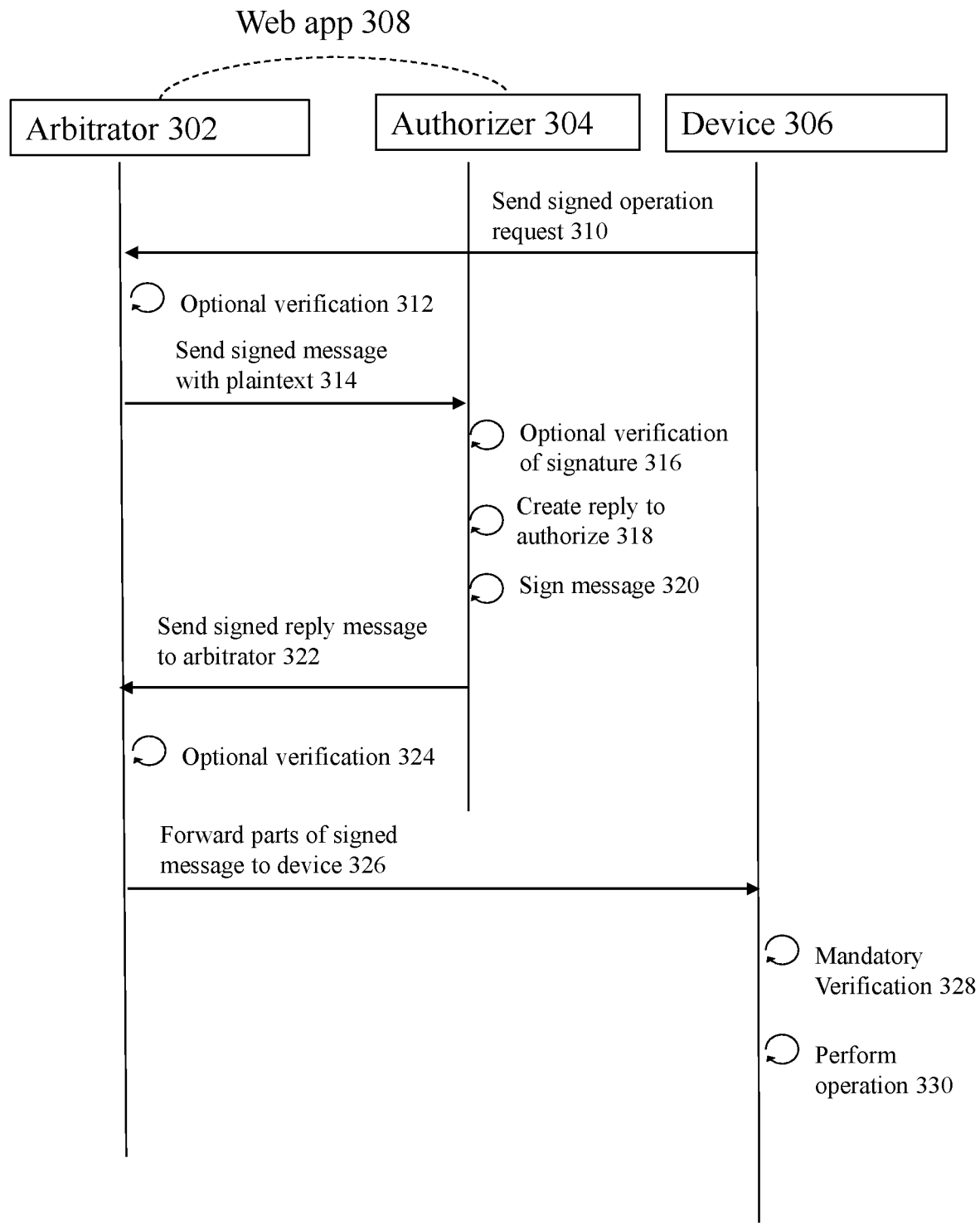
FIG. 3 shows an exemplary implementation of the presently described technology in which the method is initiated by a remote device requiring authorization to perform an operation.

Turning now to FIG. 3, there is shown a communication flow diagram of one exemplary implementation of the presently described technology in which the method 300 is initiated by remote device 306 requiring authorization from authorizer 304 to perform an operation. Device 306 sends, at flow 310, a signed operation request to arbitrator 302. Arbitrator 302 may optionally perform some verification 312, before sending a signed message with plaintext data to authorizer 304 at flow 314. Arbitrator 302 is operable to communicate with authorizer 304 via a communication means, which may be, for example, a web app 308. On receipt of the signed message and plaintext of flow 314, authorizer 304 may verify the signature 316 before creating an authorization reply 318 and signing the message 320. Authorizer 304 then sends the signed reply message to arbitrator 302 at flow 322. Arbitrator 302 may perform some form of verification 324, before sending at least parts of the signed authorization message to device 306 at flow 326. The at least parts of the signed authorization message might comprise, for example, only the text portion, omitting the HTML representation of that text. In this case arbitrator 302 may check, as part of verification 324, that the text and the HTML are consistent, thereby avoiding any potential exploitation of a mismatch—for example, if a rogue message is constructed in which permission to perform an operation X is shown in the HTML that is displayed to an authorizer 304, but the plaintext that was not shown requests operation Y. In such a case, the authorizer might be deceived into unwittingly approving an unsanctioned operation, but this deception is prevented by the expanded verification 324. Device 306 receives the at least parts of the signed authorization message from flow 326, and must then verify the message 328 before performing the requested operation 330.

Figure 4:
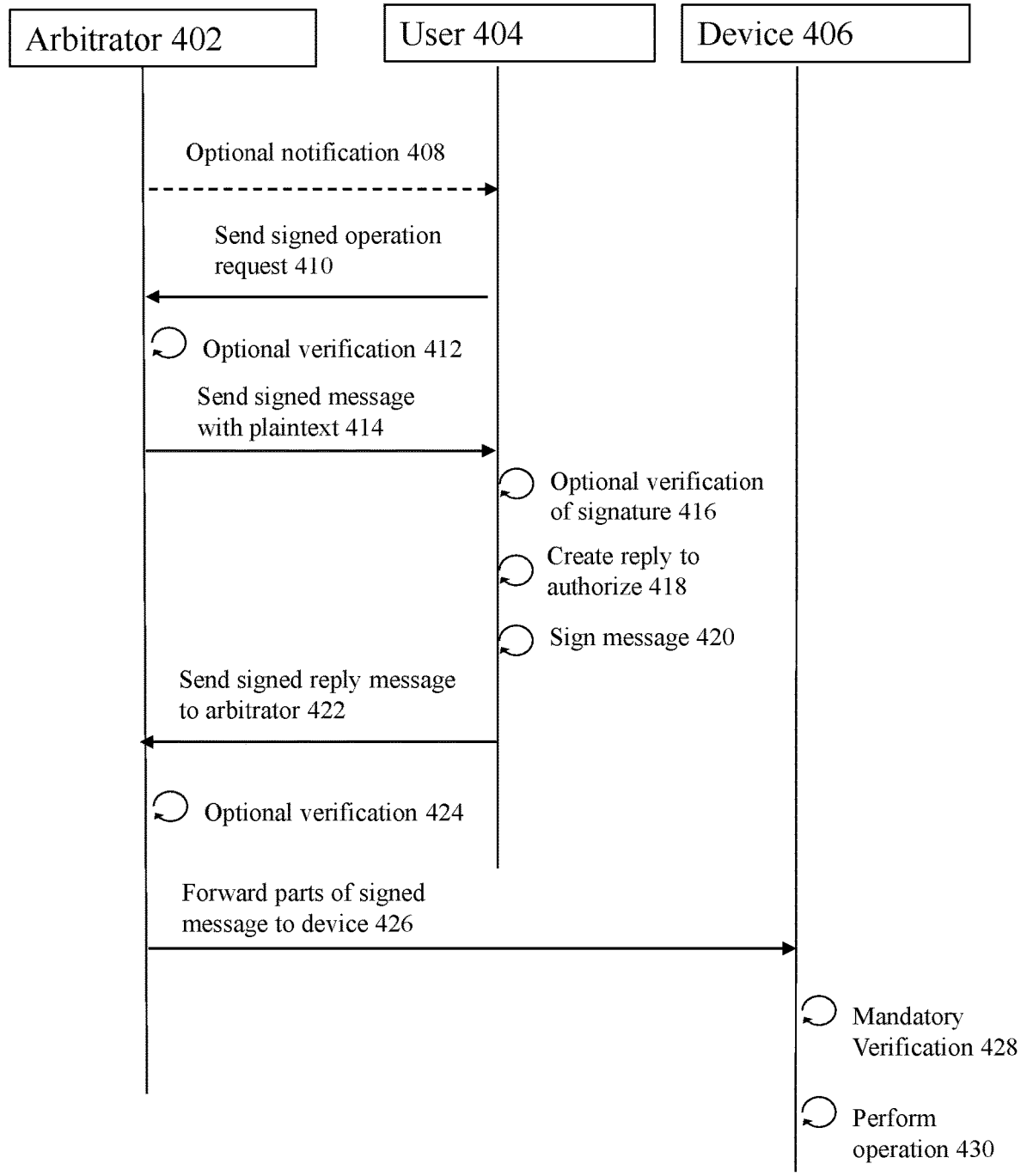
FIG. 4 shows an exemplary implementation of the presently described technology in which the method is initiated by a user.

FIG. 4 shows a communication flow diagram of a second exemplary implementation of the presently described technology in which the method 400 is initiated by a user 404. In this context, the user 404 is the party empowered to authorize operation requests for execution on remote devices, such as device 406. In some cases, arbitrator 402 may send a "for information" notification to user 404, as at flow 408, shown with a dotted arrow. Such a notification may be an indication that, for example, a new firmware image should be downloaded to devices of a specified class. Many other examples of such notifications will occur to one of ordinary skill in the computing art. With or without such a notification, User 404 is aware of a requirement to perform an operation on device 406, the operation requiring verifiable authorization. User 404 thus sends a signed operation request to arbitrator 402 at flow 410. Arbitrator 402 may optionally perform some verification 412, before sending a signed message with plaintext data to user 404 at flow 414. On receipt of the signed message and plaintext of flow 414, user 404 may verify the signature 416 before creating an authorization reply 418 and signing the message 420. User 404 then sends the signed reply message to arbitrator 402 at flow 422. Arbitrator 402 may perform some form of verification 424, before sending at least parts of the signed authorization message to device 406 at flow 426. The at least parts of the signed authorization message might comprise, for example, only the text portion, omitting the HTML representation of that text. In that case, the expanded verification described for FIG. 3 may be applied. Device 406 receives the at least parts of the signed authorization message from flow 426, and must then verify the message 428 before performing the requested operation 430. In one variant, instead of steps 422 to 426, user 404 may itself as an authorizer forward parts of the signed message to remote device 406.

Figure 5:
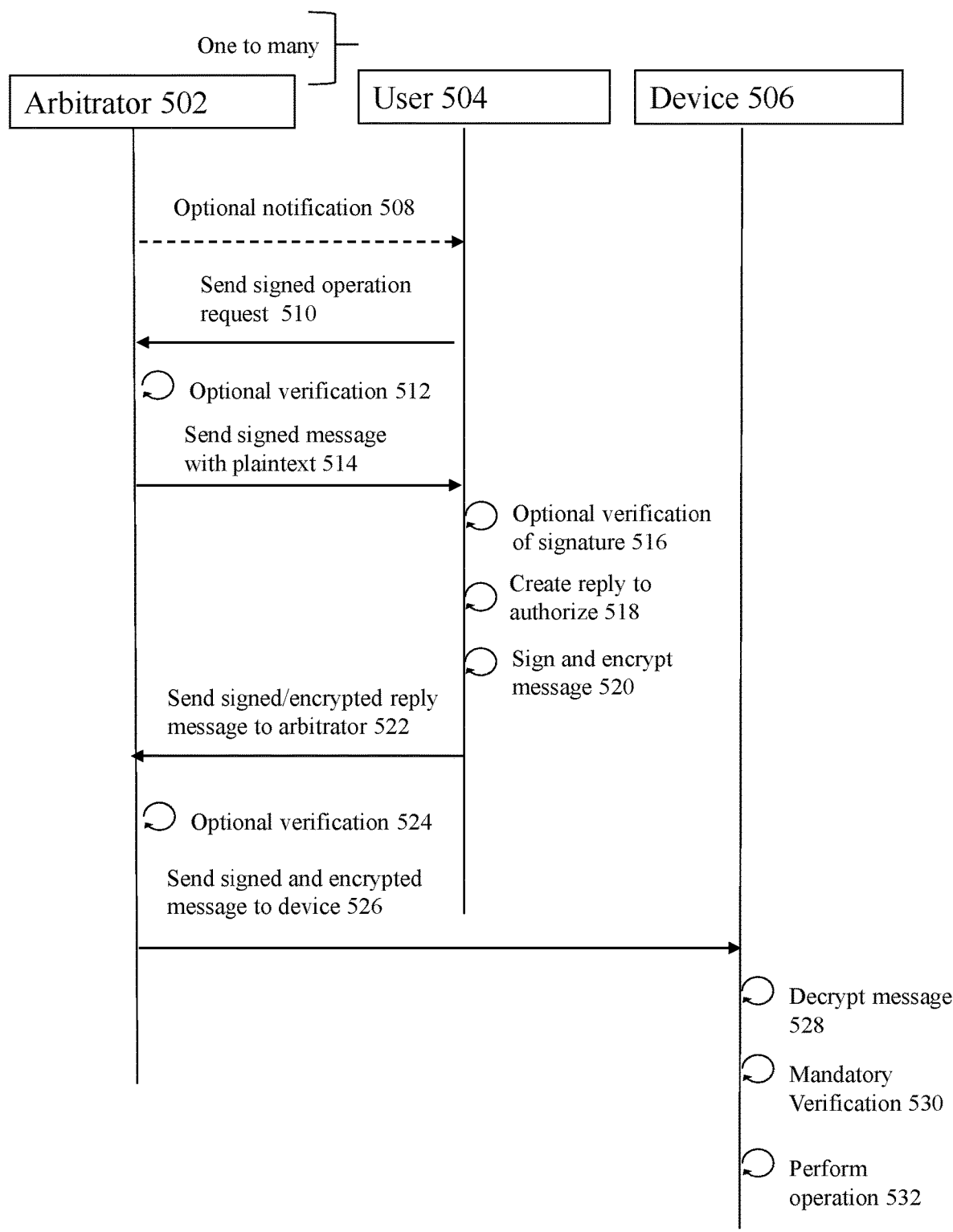
FIG. 5 shows an exemplary implementation of the presently described technology in which the method is initiated by a user, and in which the message is encrypted.

FIG. 5 shows a communications flow diagram for a third exemplary implementation of the presently described technology in which the method 500 is initiated by a user 504, and in which the message is encrypted. In this context, the user 504 is the party empowered to authorize operation requests for execution on remote devices, such as device 506. Arbitrator 502 is typically in a one-to-many relationship with instances of user 504. In some cases, arbitrator 502 may send a "for information" notification to user 504, as at flow 508, shown with a dotted arrow. Such a notification may, for example, take the form of a broadcast to plural instances of user 504. With or without such a notification, User 504 is aware of a requirement to perform an operation on device 506, the operation requiring verifiable authorization. User 504 thus sends a signed operation request to arbitrator 502 at flow 510. Arbitrator 502 may optionally perform some verification 512, before sending a signed message with plaintext data to user 504 at flow 514. On receipt of the signed message and plaintext of flow 514, user 504 may verify the signature 516 before creating an authorization reply 518 and signing and encrypting the message 520. User 504 then sends the signed and encrypted reply message to arbitrator 502 at flow 522. Arbitrator 502 may perform some form of verification 524, if it is equipped to do so on an encrypted message, before sending the signed and encrypted authorization message to device 506 at flow 526. Device 506 receives the signed and encrypted authorization message from flow 526, and must then decrypt 528 and verify the message 530 before performing the requested operation 532. In one variant, instead of steps 522 to 526, user 504 may itself as an authorizer forward parts of the signed message to remote device 506.

Figure 6:
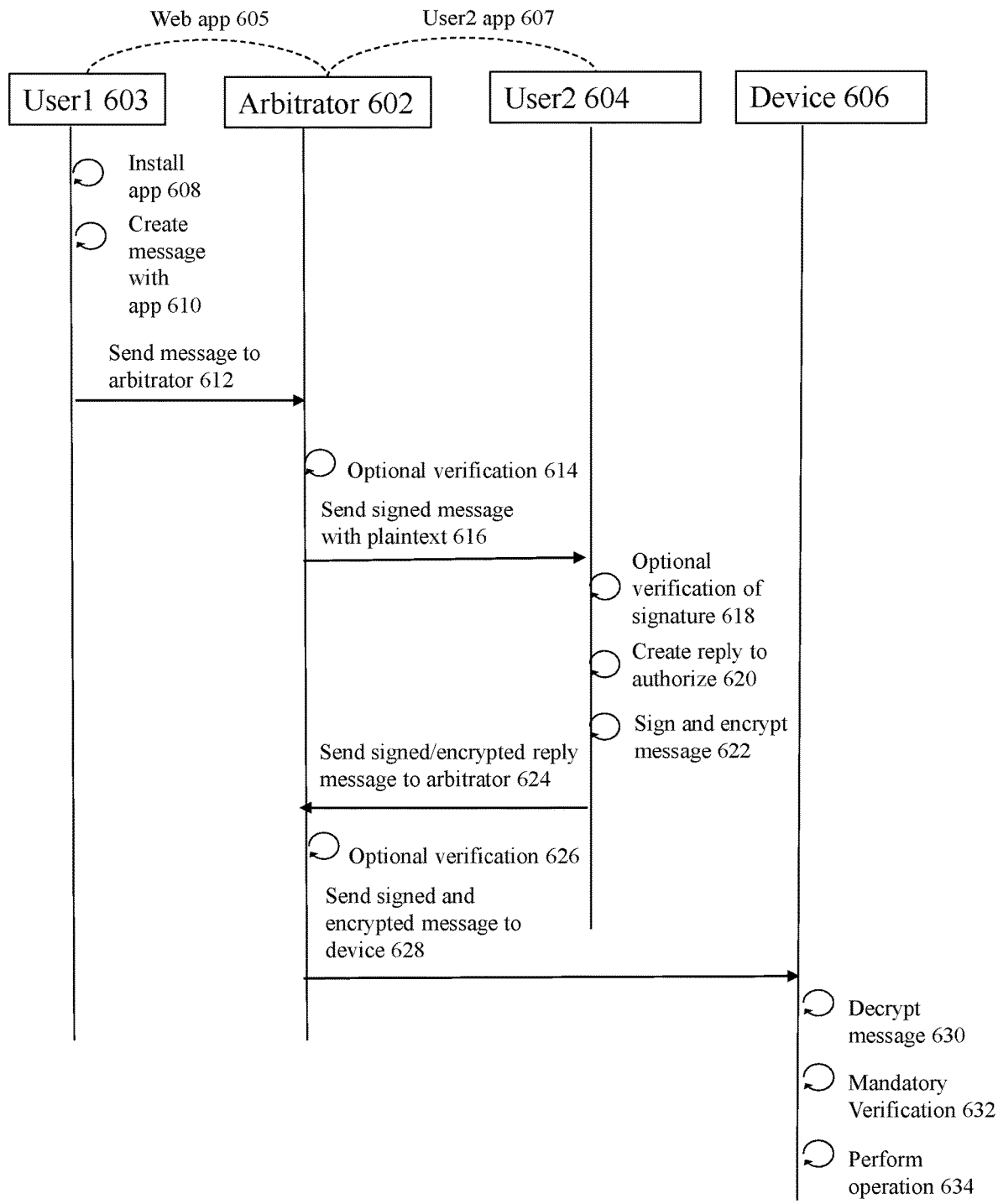
FIG. 6 shows an exemplary implementation of the presently described technology in which the method is initiated by a user, and in which apps are used by the initiating client and by the authorizing user.

FIG. 6 shows a communications flow diagram for a fourth exemplary implementation of the presently described technology in which the method is initiated by a first user (User1 603), and in which apps are used by User1 and by the authorizing user (User2 604) as part of the communication process. User1 603 needs to request performance of an operation on Device 606, but is not an authorizing entity. In the example shown, User1 603 installs Web app 605 as its means of communication with Arbitrator 602, creates a request message 610 to request performance of the operation, and sends it at flow 612 to arbitrator 602. Arbitrator 602 may optionally perform some verification 614, before sending a signed message with plaintext data to User2 604 at flow 616. On receipt of the signed message and plaintext of flow 616 via User2 app 607, User2 604 may verify the signature 618 before creating an authorization reply 620 and signing and encrypting the message 622. User2 604 then sends the signed and encrypted reply message to arbitrator 602 at flow 624. Arbitrator 602 may perform some form of verification 626, if it is equipped to do so on an encrypted message, before sending the signed and encrypted authorization message to device 606 at flow 628. Device 606 receives the signed and encrypted authorization message from flow 628, and must then decrypt 630 and verify the message 632 before performing the requested operation 634.

The signature technology used in these implementations may take many forms—in one convenient implementation using existing technology, messages may be emails using the Secure/Multipurpose Internet Mail Extensions (S/MIME) cryptographic signature technology. Thus, without installing an additional client on the system to control the security of operations on remote electronic devices, system operators can sign-off a firmware update using an existing application, such as an email client with an S/MIME email signature.

In one refinement of this implementation, by minifying the signature and sending it to the target remote device which has the corresponding Certifying Authority (CA) root for the S/MIME signature, the target remote device can take that minified proof as authorization to execute the requested operation. In one variant of this implementation, the minified proof may simply contain a reference to the operation rather than being required to contain the full instruction to perform the operation.

In one implementation, using an email system supporting the S/MIME standard, the authorizer of the system receives an email (which may be signed) with a plaintext request for a signature, some of the fields in plaintext and a reference (such as a hash, HMAC, etc.) of the requested operation instruction. The authorizer reads the email content, and adds an "Agreed", "OK", or the like in the appropriate field in the reply mail. In one exemplary implementation, the well-known CAPTCHA technique may be used to verify that the authorization comes from a human authorizer, and has not been generated by a "spoofing|" device. The messaging system, such as a conventional email client, adds an S/MIME signature to the response, thus providing an authenticable authorization that can be examined by the remote device and used to prove that the requested operation has been duly authorized by one with the power to authorize such operations.

For security reasons, S/MIME keys are commonly stored in protected key storages in the OS (and thus cannot be exported) or in Smart-Cards or USB tokens with Smart-Card emulation. Smart-Cards can additionally use a keypad to provide two-factor authentication for unlocking the S/MIME signature process to secure these operations even against local malware on the system. The email client does not need to know anything about smart cards, and no additional software needs to be installed—just the plain certificate provisioned to the user's machine. The present technology may thus be implemented in an environment-agnostic manner, as many popular email clients support S/MIME certificates natively.

In one refinement, the arbitrator (which may be a server or some other entity in the system) may verify the sign-off-email by, for example, checking if the plaintext part was unmodified and if the response is well-formed, to prevent attacks on the device by rogue operation requests. The arbitrator may then extract the email-body with the signature and forwards the relevant part to the remote device along with the original request. The arbitrator may route the relevant part of the sign-off-email that is still verifiable with the original signature to the end device in optimized form. Routing may, for example, be based on unique reply-to addresses or embedded IDs.

In addition, the full S/MIME signature data structure can be stripped down to present only the actual signature, as the device is expected to have the certificate and root certificates in place already. In that way, the payload size of the authorization message can be decreased.

The remote device receives the original request and the S/MIME body of the user's permission from the server. The device then compares the quoted plaintext message for consistency with the received request: for example, if the plaintext reason maps to the binary reason in the original request. Also, it verifies if the S/MIME signature leads to a known and allowed CA.

In those circumstances in which a device will receive a binary payload (such as a new software or firmware image) that needs to be signed, an optimization is available. In this optimized variant, the payload can be sent to the owner of the system. The owner forwards the email to a predetermined address. The act of forwarding the email causes an S/MIME signature of each section. Because the signature is that derived from a binary that the device has already received, or will receive, the bare signature can be extracted and forwarded on to the remote device. This reduces parsing overhead on the device. If the payload has been encoded before signature, the device may also be made operable to perform the same encoding before signature verification.

Additional actions may be performed by the arbitrator in some implementations; actions such as supplementing the message with intermediate certificates, or with certificate non-revocation information such as Online Certificate Status Protocol (OSCP) stapling or other forms of certificate non-revocation information, for example.

In one implementation, the arbitrator may be a central server electronic device. In a second implementation, arbitration may be performed by a peer device of the remote device in a distributed network, in which case the peer device is equipped with an independent arbitrator component. The peer device may have been elected as sole arbitrator for said network, or it may be a member of an electorate set of peer devices. In the case of an electorate set of peer devices, the electorate set is polled for signed votes to enable determination of validity of the authorization request by the arbitrator and/or the remote device. In this case, the peer device can respond to receiving sufficient signed votes by sending the request message, with the signed votes, to request performance of the operation to the remote device. The remote device is then operable to verify the signed votes in the same manner in which it verifies an individual signed request message.

Implementations of the present technology are further suitable for authorization of operations on classes of remote electronic devices, rather than on individual devices. Class authorizations may be controlled by adding limitations to their scope using additional parameters on authorization messages. For example, time limitations may be indicated by "valid-from" time indicators and/or "valid-to" time indicators. In an alternative, authorizations may be limited to devices having particular levels of hardware, software or firmware by using additional parameters specifying versions and release levels.

One particular use case for implementations of the present technology is the signing-off of critical cloud service and support operations. In this use case, a local system administrator of the customer system may have lost access to the cloud service or may need some other form of support by the administrator of the cloud service provider. Before the cloud service gives access to the customer's machine to the service provider's support-person, a sign-off-email may be sent to the manager of the cloud service for that customer to sign off. The authorization process then proceeds according to the presently described technology.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method of authorizing an operation on at least one remote electronic device equipped with a cryptographic signature verification component, said at least one remote electronic device being operable in a communications network having human-readable messages with message signatures, comprising:
   receiving at an arbitrator an authorization request to perform an operation on said at least one remote electronic device, said operation requiring authorization;
   retrieving from said request an identifier of said operation and at least one plaintext data item;
   sending by said arbitrator a human-readable request message to an authorizer, said human-readable request message comprising at least said identifier and said at least one plaintext data item;
   receiving a reply message from an address of an authorizer, said reply message comprising at least said plaintext data item and a verifiable cryptographic signature derived from said request message and identifying said authorizer; and
   responsive to receiving said reply message, sending by said arbitrator a request message to request performance of said operation to said remote electronic device with an authorization derived from at least said cryptographic signature, said cryptographic signature being suitable to be further verified by said cryptographic signature verification component on said at least one remote electronic device.

2. The method of claim 1, said sending a request message further comprising attaching, by said arbitrator, certificate non-revocation information to said request message.

3. The method of claim 1, further comprising, responsive to receiving said reply message from said address of said authorizer, verifying by said arbitrator said cryptographic signature and responsive to a negative outcome of said verification, terminating without sending said request message to said at least one remote device.

4. The method of claim 1, said receiving said authorization request at said arbitrator comprising receiving said request at a server electronic device.

5. The method of claim 1, said receiving said authorization request at said arbitrator comprising receiving said request by at least one peer device of said at least one remote electronic device in a distributed network, said peer being equipped with an independent arbitrator component.

6. The method of claim 5, said at least one peer device having been elected as sole arbitrator for said network.

7. The method of claim 5, said at least one peer device of said at least one remote electronic device being a member of an electorate set of peer devices, and said electorate set of peer devices being polled for signed votes to enable determination of validity of said authorization request by at least one of said arbitrator and said at least one remote electronic device.

8. The method of claim 7, said at least one peer device being responsive to receiving sufficient votes to send said request message with said signed votes to request performance of said operation to said at least one remote electronic device, said at least one remote electronic device being operable to verify said signed votes.

9. The method of claim 1, said receiving at said arbitrator an authorization request to perform an operation on said at least one remote electronic device comprising receiving said request for a class of remote electronic devices.

10. The method of claim 1, said receiving at said arbitrator an authorization request to perform an operation on said at least one remote electronic device comprising receiving said request with a time-related limitation.

11. The method of claim 10, wherein said time-related limitation comprises at least one of a valid-from time indicator and a valid-to time indicator.

12. The method of claim 1, said receiving at said arbitrator an authorization request to perform an operation on said at least one remote electronic device comprising receiving said request with a limitation based on at least one of a version and a release level.

13. A computer program comprising computer program code to, when loaded into a non-transitory computer system and executed thereon, cause said computer system to:
   receive at an arbitrator an authorization request to perform an operation on at least one remote electronic device, said operation requiring authorization;
   retrieve from said request an identifier of said operation and at least one plaintext data item;
   send by said arbitrator a human-readable request message to an authorizer, said human-readable request message comprising at least said identifier and said at least one plaintext data item;
   receive a reply message from an address of an authorizer, said reply message comprising at least said plaintext data item and a verifiable cryptographic signature derived from said request message and identifying said authorizer; and
   responsive to receiving said reply message, send by said arbitrator a request message to request performance of said operation to said remote electronic device with an authorization derived from at least said cryptographic signature, said cryptographic signature being suitable to be further verified by a cryptographic signature verification component on said at least one remote electronic device.

14. An electronic data processing system adapted to communicate with at least one arbiter to authorize an operation on at least one remote electronic device equipped with a cryptographic signature verification component, said at least one remote electronic device being operable in a communications network having human-readable messages with message signatures, comprising:
   electronic logic to receive at an arbitrator an authorization request to perform an operation on said at least one remote electronic device, said operation requiring authorization;
   electronic logic to retrieve from said request an identifier of said operation and at least one plaintext data item;
   electronic logic to send by said arbitrator a human-readable request message to an authorizer, said human-readable request message comprising at least said identifier and said at least one plaintext data item;
   electronic logic to receive by said arbitrator a reply message from an address of an authorizer, said reply message comprising at least said plaintext data item and a verifiable cryptographic signature derived from said request message and identifying said authorizer; and
   electronic logic, responsive to receiving said reply message, to send by said arbitrator a request message to request performance of said operation to said remote electronic device with an authorization derived from at least said cryptographic signature, said cryptographic signature being suitable to be further verified by said cryptographic signature verification component on said at least one remote electronic device.

* * * * *